US 6,581,903 B2

(12) United States Patent
Yokoyama et al.

(10) Patent No.: US 6,581,903 B2
(45) Date of Patent: Jun. 24, 2003

(54) ELECTRICAL FLOW CONTROL VALVE

(75) Inventors: Hisashi Yokoyama, Tokyo (JP);
Toshihiko Miyake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 10 days.

(21) Appl. No.: 09/319,594

(22) PCT Filed: Feb. 24, 1998

(86) PCT No.: PCT/JP98/00735

§ 371 (c)(1),
(2), (4) Date: Jun. 8, 1999

(87) PCT Pub. No.: WO99/44275

PCT Pub. Date: Sep. 2, 1999

(65) Prior Publication Data

US 2002/0008219 A1 Jan. 24, 2002

(51) Int. Cl.$^7$ ............................................. F16K 31/02
(52) U.S. Cl. ............... 251/129.11; 310/90; 123/568.24
(58) Field of Search ................ 251/129.11, 129.12, 251/129.13; 310/90; 384/226, 227, 240, 243, 244, 245, 246; 123/568.21, 568.23, 568.24, 568.26

(56) References Cited

U.S. PATENT DOCUMENTS

| 2,229,969 | A | * | 1/1941 | Goss ........................... 384/244 |
| 4,186,548 | A | * | 2/1980 | Stahlecker .............. 384/240 X |
| 5,351,935 | A | | 10/1994 | Miyoshi et al. ......... 251/129.11 |
| 5,501,201 | A | | 3/1996 | Miyoshi et al. ..... 251/129.11 X |
| 5,811,903 | A | * | 9/1998 | Ueno et al. .................... 310/90 |
| 5,898,247 | A | * | 4/1999 | Lee ............................... 310/90 |

FOREIGN PATENT DOCUMENTS

| JP | 5-176520 | 7/1993 |
| JP | 8163856 A | 6/1996 |
| JP | 8266034 A | 10/1996 |

* cited by examiner

Primary Examiner—Ehud Gartenberg
Assistant Examiner—Eric Keasel
(74) Attorney, Agent, or Firm—Sughrue Mion, PLLC

(57) ABSTRACT

An electrical flow control valve is provided which comprises a retention section for centering a ball retained between one end of a rotor and a surface facing the end. A boss is provided which projects from a motor housing towards a motor holder, is integrated with said motor housing, and retains a bearing in a fixed position. This arrangement allows the greater axial alignment accuracy of the rotor and the stator and greater axial alignment and simplification of the structure of the motor.

3 Claims, 8 Drawing Sheets

| TERMINAL PHASE | ① | ② | ③ | ④ |
|---|---|---|---|---|
| 0 | ON | OFF | OFF | ON |
| 1 | ON | OFF | ON | OFF |
| 2 | OFF | ON | ON | OFF |
| 3 | OFF | ON | OFF | ON |

ELECTRICAL FLOW CONTROL VALVE

FIELD OF THE INVENTION

The present invention relates to an electrical flow control valve used in devices such as exhaust gas re-circulation control devices for the purpose of reducing exhaust gas emissions of NOx or the like from internal combustion engines.

BACKGROUND OF THE INVENTION

FIG. 1 is a block diagram which shows conventional exhaust gas re-circulation control device. In FIG. 1, reference numeral 1 denotes an internal combustion engine, 2 is an intake pipe allowing inflow of air to the engine, 3 is an intake manifold allowing inflow of air to each pipe branching from the intake pipe 2, 4 is an air cleaner provided upstream of the intake pipe 2, 5 is an injector which is provided in the intake pipe 2 and injects fuel. Air entering the intake pipe 2 through the air cleaner 4 flows into the engine 1 together with fuel supplied from the injector 5.

6 represents a throttle valve which varies the degree of air intake into the engine 1 and 7 is an idle rotation speed control valve provided in a bypass which bypasses the throttle valve 6. The gas mixture which enters the engine 1 is ignited by an ignition plug not shown in the figure. After combustion, the exhaust gases pass through the exhaust gas pipe 8, are purified by the purification device 9 comprising a catalytic converter and are expelled into the atmosphere. 10 is an electrical flow control valve of a step motor type which is disposed in the exhaust gas re-circulation passage and controls the flow of exhaust gases in the passage.

11 is an electronic control unit which generates control signals to the electrical flow control valve 10 on the basis of information received from the driving state detection means comprising elements such as a throttle aperture sensor 12 which detects the degree of aperture of the throttle valve 6, a pressure sensor 13 which detects the pressure in the intake pipe, a water temperature sensor 14 which detects the temperature of the engine cooling water, and the ignition device made up of the ignition coil 15 and the igniter 16.

FIG. 2 is a diagram which shows the above electrical flow control valve 10. 21 is a valve housing having an inlet port 21a which communicates with the engine exhaust gas pipe 8, an outlet port 21b which communicates with the engine intake pipe 2 and a rotary flow passage 21c which is the passage between the inlet port 21a and the outlet port 21b. 22 is a valve seat provided in the rotary flow passage 21c of the valve housing 21. 23 is a valve body which opens and closes the aperture of the valve seat 22. 24 is a valve shaft on one end of which the valve body 23 is mounted and which displaces the valve body 23 to the open and closed position by reciprocating motion as a valve rod. 25 is a bush which acts as a bearing for the valve shaft 24 mounted in the valve housing 21. 27 is a spring holder mounted on the other end of the valve shaft 24 which projects externally from the valve housing 21.

28 is a bracket, for example made of cast iron, formed as a unit with the valve housing 21 on the side from which the valve shaft 24 projects from the valve housing 21. The bracket 28 is in a cup shape of fixed height in the shape of a truncated cylindrical concavity on the step motor side (hereafter called the indented part).

A flange element 28b which mounts the stepping motor 29 with a spacing member 31 and a mounting screw 32 through the holder 30 is formed on the stepping motor 29 side of the bracket 28. The cross sectional size of the flange 28b is of a size having the minimum necessary strength to support the stepping motor 29 or is of a slightly larger size (for example a size having a surface area twice that of the necessary strength).

Furthermore around the flange element 28b, an aperture 28c is formed which communicates with the indented part 28a. Then on the valve housing side 21 of the bracket 28, a holder 26 is formed which prevents the build-up of deposits within the vertical range of the bush 25 displaced by the valve shaft 24.

The motor holder 30 is made of material having good thermal conductivity, a lower bearing 33 is mounted in the central lower hollow part, and the length of an integrated heat radiating fin 35 forms a gap 34 between the valve housing on the valve housing side. These components make it possible to decrease the transmission of high temperature exhaust gases to the step motor 29.

Next, the components of the step motor 29 will be explained. 36 is a hollow motor housing, 37 is a rotor which is supported in free rotation by a ball 49 and a sleeve bearing 38 at its upper end, and by a lower bearing 33 at its lower end. A magnet 39 is mounted on its outer periphery. The central part of the rotor 37 is hollow in the vertical direction, displaces vertically and has a threaded section 37a formed on its inner face.

40a and 40b are upper and lower yokes which are mounted on the inner part of the motor housing 36 so as to face the magnet 39 of the rotor 37 and in the inner part of which are housed bobbins 41a and 41b. 42a1 and 42a2 are coils wound around the bobbin 41a, 42b1 and 42b2 are coils wound around the bobbin 41b, and 43 is a plate magnetically separating the upper and lower yokes 40a and 40b. 44 is a protective plate which is provided in the upper part of the motor housing 36 for preventing entry of resinous material into the insertion part of the rotor when forming the motor housing 36. 45 is an actuator rod which is supported in a threadedly engaged state by the threaded section 37a of the inner part of the rotor 37 and which projects downwardly from the motor holder 30. The tip of the actuator rod 45 displaces vertically and pushes against the valve shaft 24.

Due to the fact that the actuator rod 45 is prevented from rotating by the bearing of the actuator rod and the motor bush 54 which has a rotation prevention function, the actuator rod 45 displaces vertically in response to the rotations of the rotor 37. A stopper 45b is provided in the actuator rod which pushes against and detaches from the stopper 37b of the rotor 37 and limits the upward displacement above a fixed amount. 46 is a plate which is assembled in the indented part 37c which is provided on the upper end of the rotor 37. 47 is an indented part which is formed on the protective plate 44 on the shaft line of the rotor 37, and which centers the ball 49 on the plate 46.

50 is a SPL washer for providing pre-load to the lower bearing 33. 51 is a connector which supplies electrical pulses to each coil. As shown in FIG. 4, the connector 51 comprises the terminals ①–⑥ which are electrically connected to the coils 42a1, 42a2, 42b1, 42b2, and the connector housing 51a. As shown in FIG. 3, switching transistors Tr1–Tr4 are connected to the ground line of the terminals, ①, ③, ④, ⑥. Terminal ② to which one end of the coils 42a1 and 42a2 is connected and terminal 5 to which one end of the coils 42b1 and 42b2 is connected, are connected to the electrical supply terminal +B through the switch SW. The connector housing 51a and the motor housing 36 are integrated by resinous material. 52 is a coil spring which intercalates between the spring holder 27 and the bracket 28. The coil spring pushes the valve shaft 24 upwardly towards the middle of the figure through the spring holder 27 and maintains the valve body 23 in a closed state. While in a closed state, a gap is formed between the valve shaft 24 and the actuator rod 45 and the valve body 23 is maintained in an accurately closed state.

Next the operation of the electrical flow control valve will be explained. The rotor 37 of the stepping motor 29 which acts as a motive source does not rotate continuously but only makes a single rotation. If an electrical current is applied to the top of the coils 42$a$1 and 42$a$2 in a counter-clockwise direction as viewed from above, the upper face of the coils will be a north pole N, the lower face will be a south pole S and the stator will be a north pole. Likewise if a current is applied to the lower face of the coils 42$b$1 and 42$b$2, a magnetic pole will be generated in the stator. As a magnet is provided which is minutely divided into S poles and N poles in the rotor, the rotor 37 rotates to a stabilized position in the stator. As shown in FIG. 4 one step at a time is rotated by changing the phase in a sequential manner. For, example when the valve body 23 is in the opened position, the phase is changed in the sequence $0 \to 1 \to 2 \to 3 \to 0 \to 1$, when in the closed position the phase is changed in the sequence $0 \to 3 \to 2 \to 1 \to 0 \to 3$. In response to the rotations of the rotor 37, the actuator rod 45 which threadedly engages with the threaded section 37$a$ of the rotor 37 moves downwardly in the figure, repelled by the elastic force of the coil spring 52 which is compressed between the bracket 28 and the spring holder 27, displaces the motor shaft 24 downwardly and opens the valve body 23. In such a way, the flow of the high temperature engine exhaust gases on the inlet port side 21$a$ of the valve housing 21 is controlled by the valve body 23 and is directed to the outlet port side 21$b$ through the rotary flow passage 21$c$.

Furthermore since generated poles of the stator rotate in the opposite direction if the conducting phase order with respect to the coils 42$a$1, 42$a$2, 42$b$1, 42$b$2 is changed, the rotor 37 is rotated in the opposite direction to the above. In response to the direction of rotation of the rotor 37, the actuator rod 45 displaces upwardly towards the middle of the figure. As a result, the valve shaft 24 displaces upwardly towards the middle of the figure due to the coil spring 52 and the valve 23 closes. When the stopper 45$b$ reaches the stopper 37$b$ of the rotor 37, the displacement of the actuator rod 45 terminates.

Since the conventional electrical flow control valve is constructed as above, the centering of the rotor 37 is carried out by the sleeve bearing 38 and the indented part 47 of the protective plate 44 which receives the ball 49 which is provided between the motor housing 36 the plate 46 which is provided on the end face of the rotor 37 and the sleeve bearing 38. Thus, the conventional electric flow control valve creates the problems of too many parts, difficulty of assembling and higher costs because the sleeve bearing is expensive.

There is the further problem that the positional accuracy (degree of coaxiality) of the motor housing and the boss of the motor holder needs to be, increased since the boss of the motor holder performs the positional determination of the bearing which receives the other end of the motor shaft.

The present invention is proposed to solve the above problems. It has the object of dispensing with the spring bearing and reducing the number of parts and the cost. It has the further object of easily increasing the positional accuracy of the bearing.

SUMMARY OF THE INVENTION

The present invention relates to an electrical flow control valve which displaces an actuator rod by reciprocal motion by the action of a motor, which impels a valve shaft normally biased in the direction of valve closure and opens a valve. A retention section is provided which has the function of centering a ball which should be maintained between one end of a rotor and the opposing face of that end. As a result it is possible to dispense with a sleeve bearing. Hence, friction can be reduced, as well as costs.

The axial alignment accuracy of the motor housing is simply improved by the provision of a boss which projects from a motor housing towards a motor holder, which is integrated with a motor housing and which retains a bearing in a fixed position.

A retention section is provided which has the function of centering a ball which should be maintained between one end of a rotor and the opposing face of that end. A boss is provided which projects from a motor housing towards a motor holder, which is integrated with a motor housing and which retains a bearing in a fixed position. Thus, it is possible to dispense with a sleeve bearing and to simply improve the axial alignment accuracy of the motor and the stator.

DESCRIPTION OF THE PREFERRED EMBODIMENTS OF THE INVENTION

Figure 1:
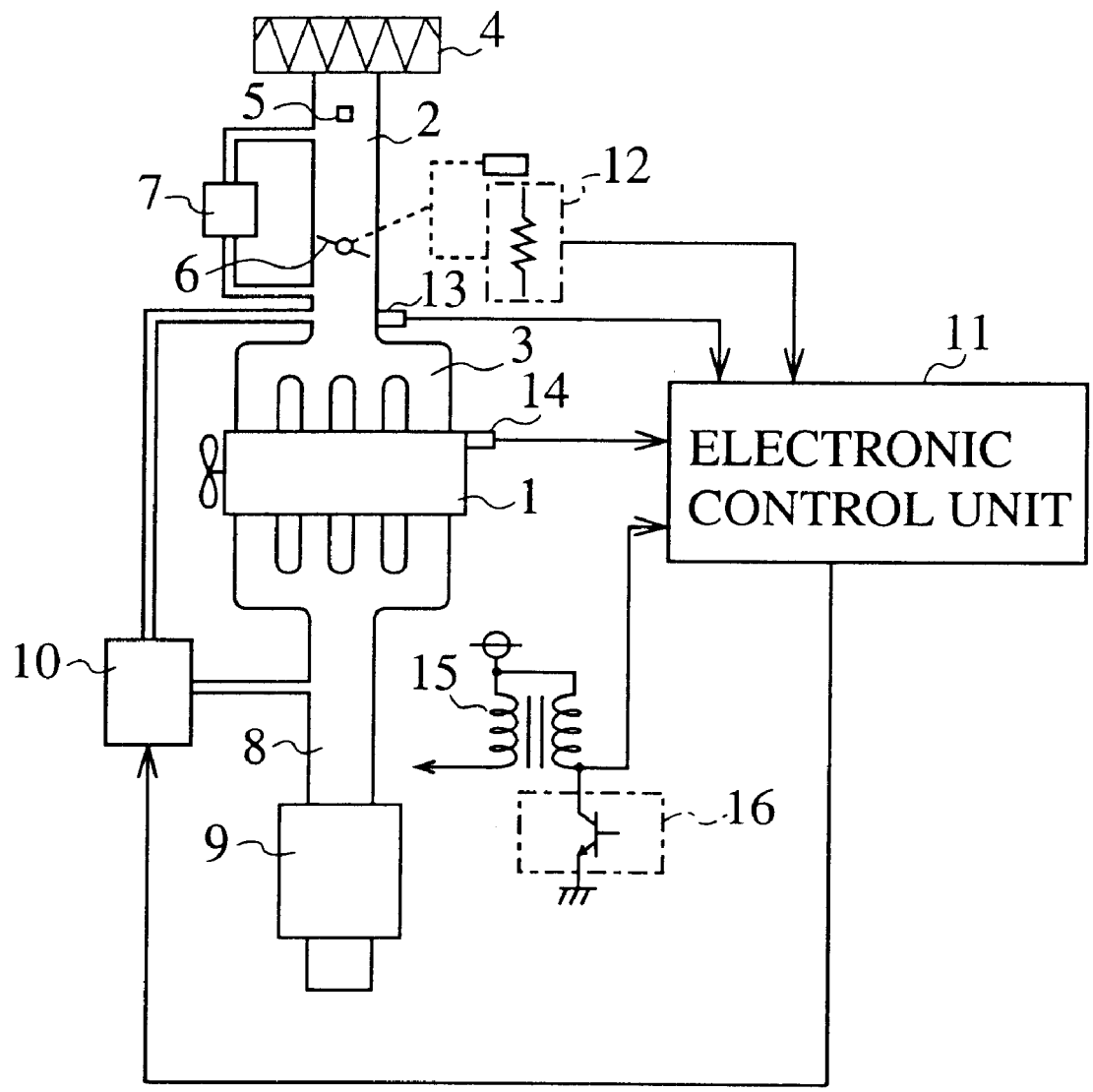
FIG. 1 shows an exhaust gas re-circulation valve.

The preferred embodiments of the present invention are described below with reference to the accompanying figures.

FIGS. 5–10 show an electrical flow control valve according to a first embodiment of the present invention. 101 is a valve housing having an inlet port 101$a$ which communicates with the exhaust pipe 8 of the engine 1, an outlet port 101$b$ which communicates with the intake pipe 2 of the engine 1, and a re-circulation passage which comprises a passage between the inlet port 101$a$ and the outlet port 101$b$. 102 is a valve seat provided in the re-circulation passage 101c of the valve housing 101. 103 is a valve body which opens and closes the aperture of the valve seat 102. 104 is a valve shaft on which is mounted one end of the valve body 103, which displaces in reciprocal motion, and which acts as a valve rod which displaces the valve body to the open and closed positions. 105 is a bush which acts as a bearing of the valve shaft 104 mounted on the valve housing 101. 107 is a spring holder mounted on one end of the valve shaft 104 which projects outwardly from the valve housing 101.

108 is a bracket formed from cast iron, for example, and integrated with the valve housing 101 on the side on which the valve shaft projects from the valve housing 101. The bracket 108 is formed in a cup shape of fixed height in the shape of a truncated cylindrical concavity on the step motor side 109 (hereafter called the indented part 108a).

On the step motor side 109 of the bracket 108, a flange 108b is formed on which a step motor 109 is mounted by an interval retaining member 111 and a mounting screw 112 through a motor holder 110. The cross sectional size of the mounting screw 108b is of the minimum necessary affording sufficient strength to support the step motor 109 or may be of a slightly larger size (for example, twice the size required for the necessary strength). An aperture 108c is formed on the periphery of the flange 108b which communicates with the indented part 108a. Furthermore a holder 106 is formed on the valve housing side 101 of the bracket 108 which prevents the deposition of deposits in the valve shaft 104 in the vertical movable range in the bush 105.

The motor holder is formed from materials displaying good thermal conductivity. A bearing 113 is mounted in the hollow lower central part and is integrated with the length of the heat radiating fin 115 which forms a gap 114 between the valve housing on the valve housing side. By this arrangement, the movement of high temperature exhaust gas to the step motor side 109 can be reduced.

Next, the construction of the step motor will be explained. 116 is a hollow motor housing and 117 is a rotor. The upper section of the rotor is a ball 129, the lower section is freely rotatable about a lower bearing 113 and a magnet 119 is mounted on the outer periphery. The central section of the rotor 117 is hollow and is oriented in the vertical direction and has a threaded section formed in the interior.

120a and 120b are upper and lower yokes which are mounted inside the motor housing 116 so as to face the magnet 119 of the rotor 117 and in which are stored bobbins 121a, 121b. 122a1, 122b1 are coils which are wound on the bobbin 121b. 123 is a plate which magnetically separates the upper and lower yokes 120a, 120b. 124 is a protective plate provided on the upper section in the motor housing 116 for the purpose of preventing resinous material from entering the rotor insertion section when the motor housing is formed. 125 is an actuator rod which is supported in a threadedly engaged state in the threaded section 117a of the rotor, which projects downwardly from the motor holder 110, the distal tip of which displaces vertically and which pushes on the valve shaft 104.

The actuator rod 125 displaces vertically since it is prevented from rotating by the actuator rod bearing and the motor bush 134 which has a rotation preventing function. A stopper 125b is disposed in the actuator rod 125 which pushes against and detaches from the stopper 117b of the rotor 117 and which prevents upward displacement above a fixed amount. 126 is a plate which is provided in the upper edge of the rotor 117. Retention sections 126a and 124a which have the function of centering a ball 129 are provided facing each other on the plate 126 and the protective plate 124.

Figure 2:
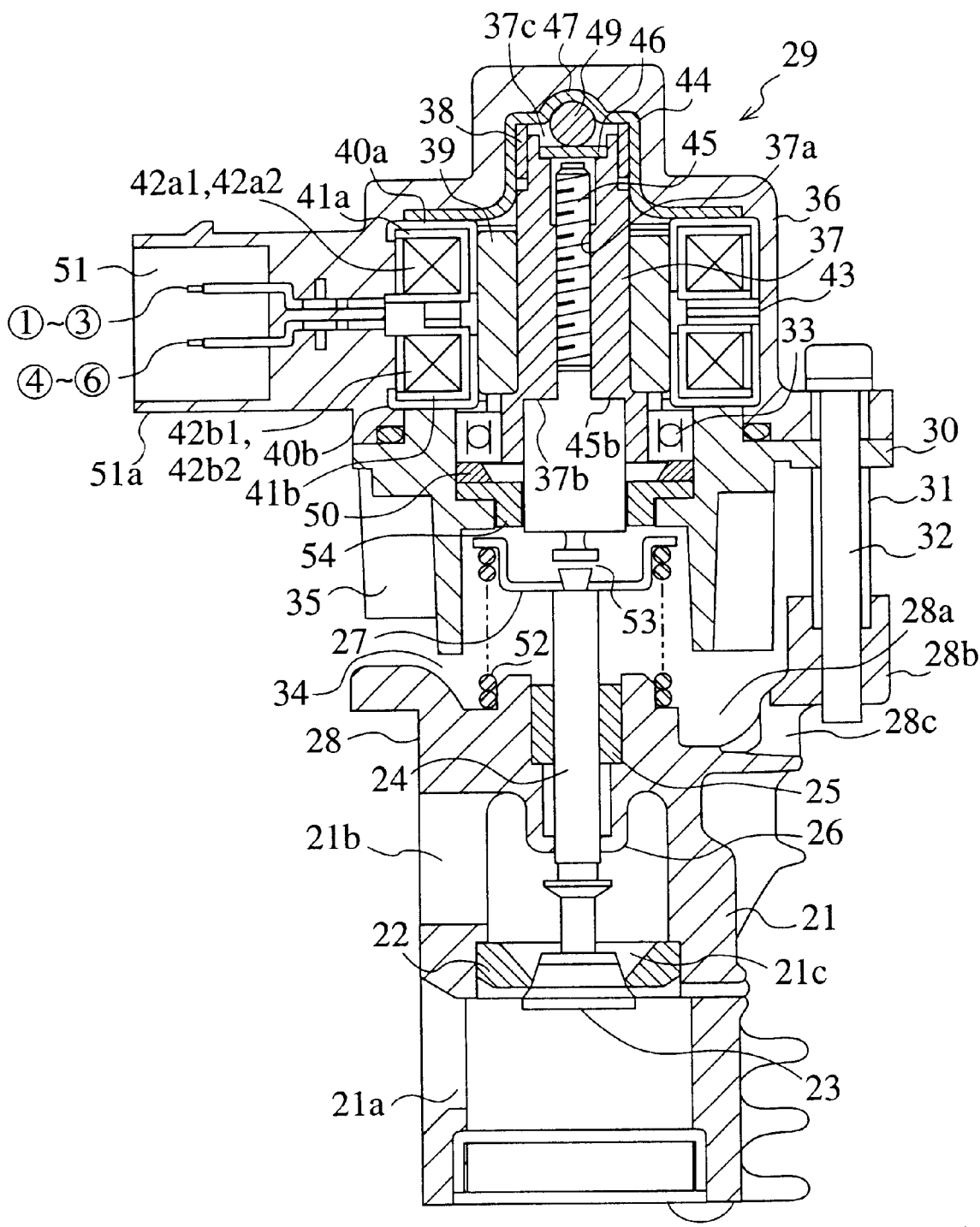
FIG. 2 is a longitudinal cross section which shows a conventional electrical flow control valve.
Figure 3:
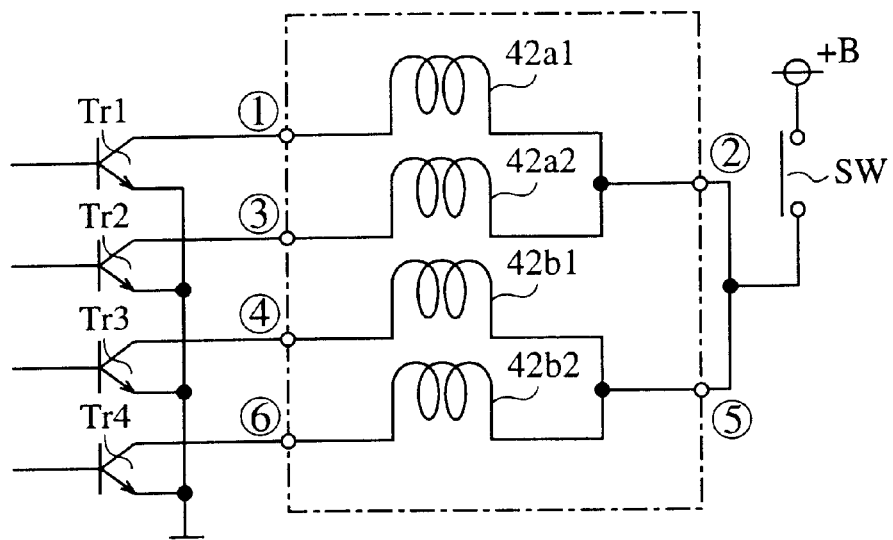
FIG. 3 is a circuit diagram of a motor coil.

130 is a SPL washer for providing pre-load to the bearing 113. 131 is a connector which supplies electrical pulses to each coil. The connector 131 as shown in FIG. 2, is formed from the connector housing 131a and the terminals ①–⑥ which are electrically connected to the power source terminal +B and the coils 122a1, 122a2, 122b1, 122b. 132 is a coil spring interposed between the spring holder 107 and the bracket 108. The valve shaft 104 is urged towards the upper section of the figure through the spring holder 107 and maintains the valve body 103 in the closed position. When in the closed position, a gap forms between the valve shaft 104 and the actuator rod 125, and the valve body is accurately maintained in the closed position.

Figure 4:
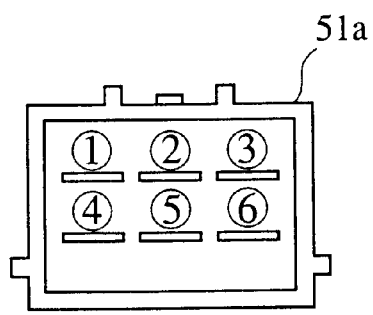
FIG. 4 is a current phase diagram of a coil.
Figure 5:
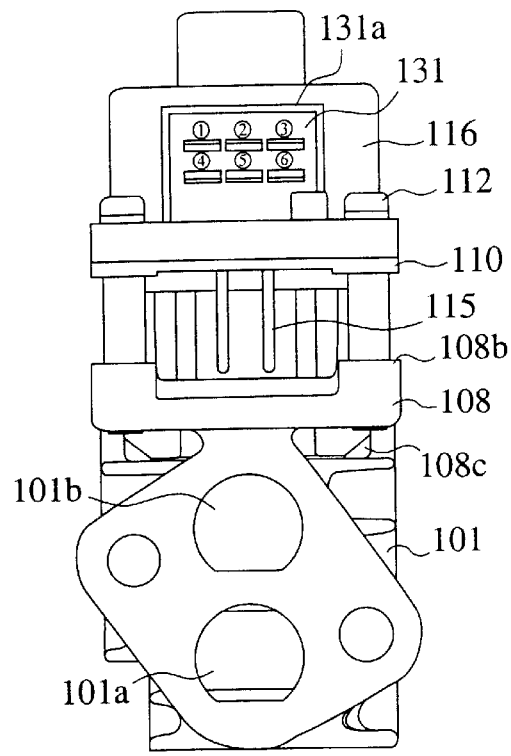
FIG. 5 is a front view of an electrical flow control valve according to a first embodiment of the present invention.
Figure 6:
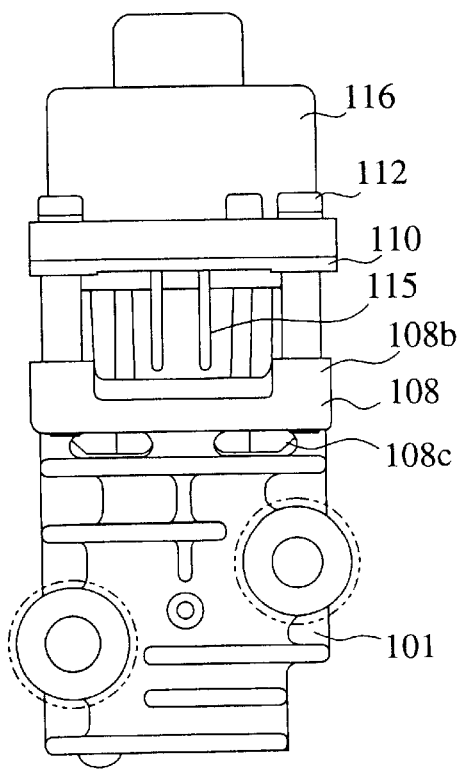
FIG. 6 is a rear view of an electrical flow control valve according to a first embodiment of the present invention.
Figure 7:
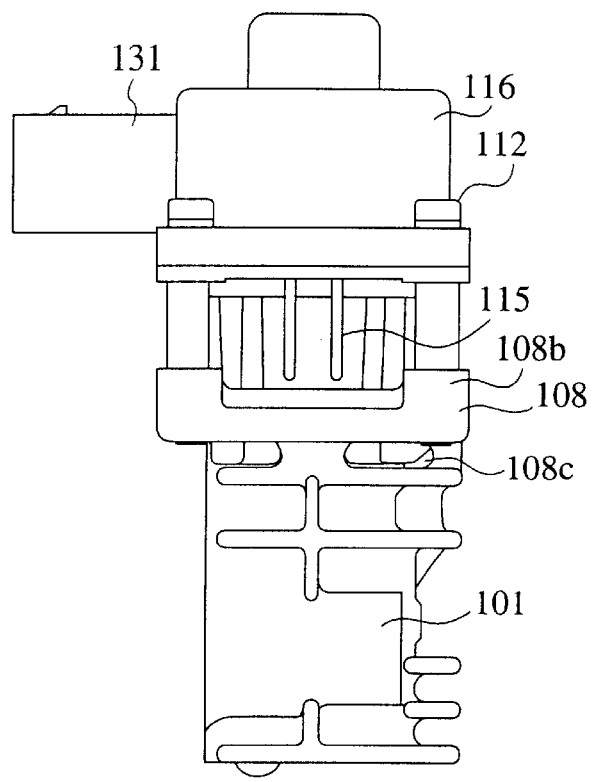
FIG. 7 is a right side view of an electrical flow control valve according to a first embodiment of the present invention.
Figure 10:
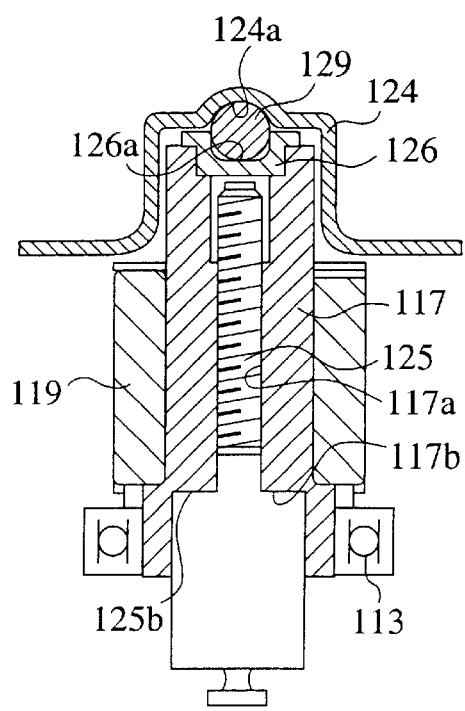
FIG. 10 is an enlarged longitudinal cross section of a rotor.
Figure 8:
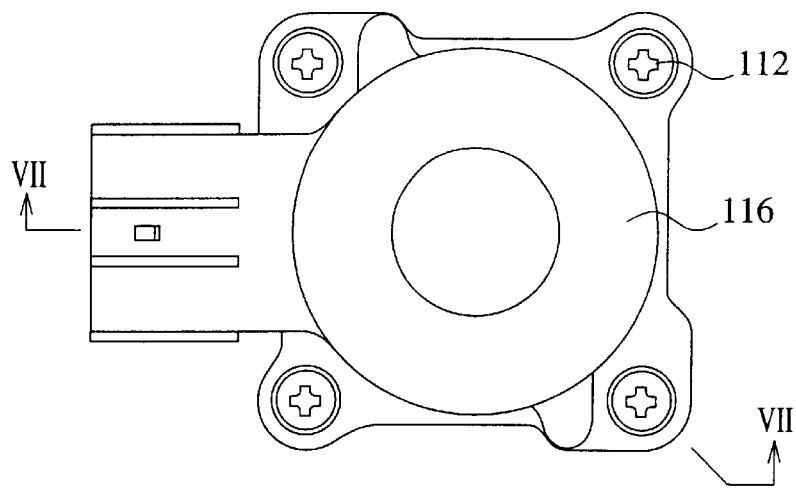
FIG. 8 is a plan view of an electrical flow control valve according to a first embodiment of the present invention.

Next, the operation of the electrical flow control valve will be explained. As shown in FIG. 4, the rotor 117 rotates in a stepwise fashion on the basis of the ordered variation of the electrical phase with respect to the coils 122a1, 122a2, 122b1, 122b.

At this time the lower section of the rotor 117 is supported by the bearing 113. Since the upper section of the rotor 117 is supported by a ball 129 which is supported by the retention sections 126a, 124a which have a centering function, the smooth rotation of the rotor 117 can be ensured without the provision of a sleeve bearing in the upper section of the rotor 117.

The actuator rod 125 which is threadedly engaged to the threaded section 117a of the central part of the rotor is displaced for example downwardly in the figure by the rotations of the rotor 117. The rod 125 is repelled by the elastic force of the coil spring compressed between the bracket 108 and the spring holder 107, displaces the valve shaft 104 in the downward direction and opens the valve body 103. In this way, the flow of high temperature exhaust gas from the inlet port 101a of the valve housing 101 is controlled by the valve body 103 and the flow is displaced to the outlet port 101b through the re-circulation passage 101c.

If the electrical phase order with respect to the coils 122a1, 122a2, 122b1, 122b2 is reversed, the magnetic field generated by the stator will rotate in the opposite direction. Hence, the stator will rotate in the opposite direction. In accordance with the direction of rotation of the rotor 117, the actuator rod 125 displaces to the upper section of the figure. As a result, the valve shaft 104 displaces in the upper direction of the figure due to the coil spring 132 and the valve body 103 is closed. When the stopper 125b abuts with the stopper 117b of the rotor 117, the displacement of the actuator rod 125 is terminated.

As discussed above, according to a first embodiment of the invention, it is possible to dispense with a sleeve bearing by forming a protective plate 124 provided on the inner surface of the motor housing 116 facing a plate 126 which is provided on one end of the rotor 117, and retention sections 126a and 124a which have the function of centering a ball 129 between the two plates. As a result it is possible to reduce both friction and costs.

Figure 9:
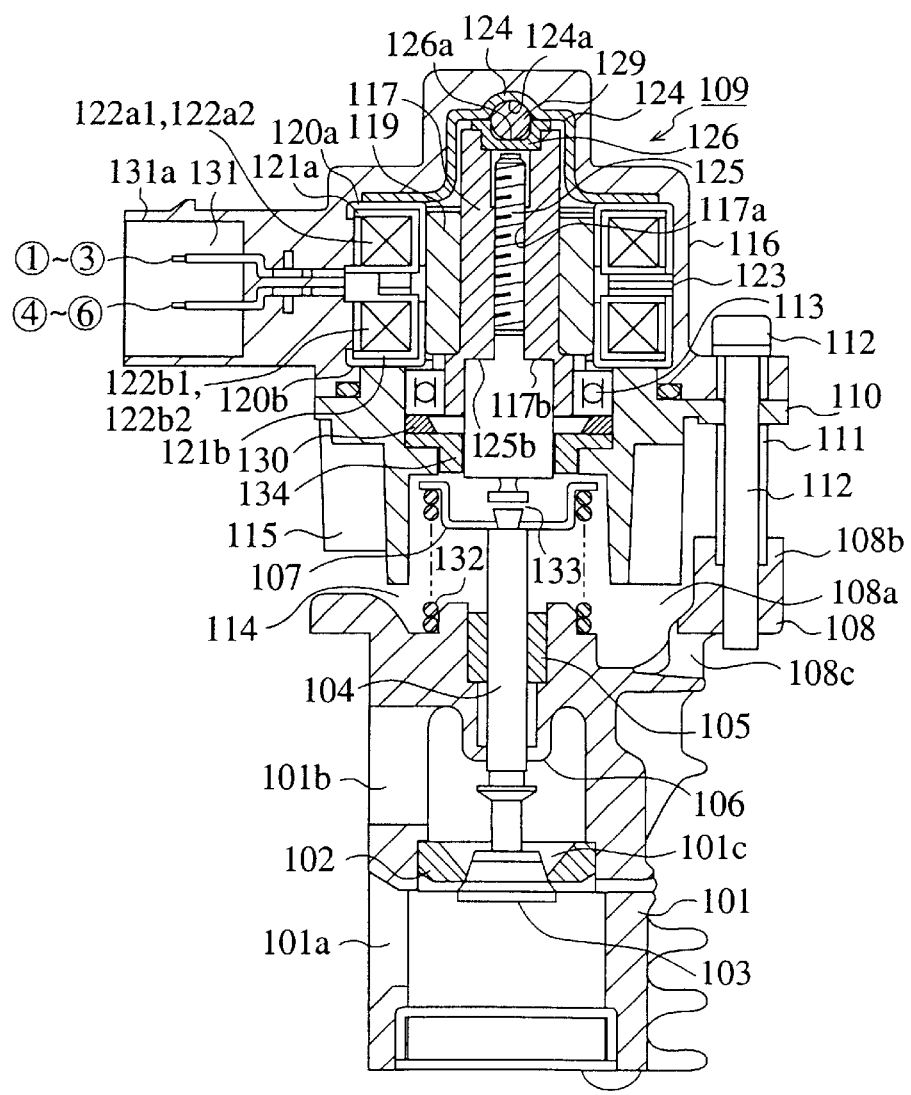
FIG. 9 is a longitudinal cross section along line VII—VII of FIG. 8.
Figure 11:
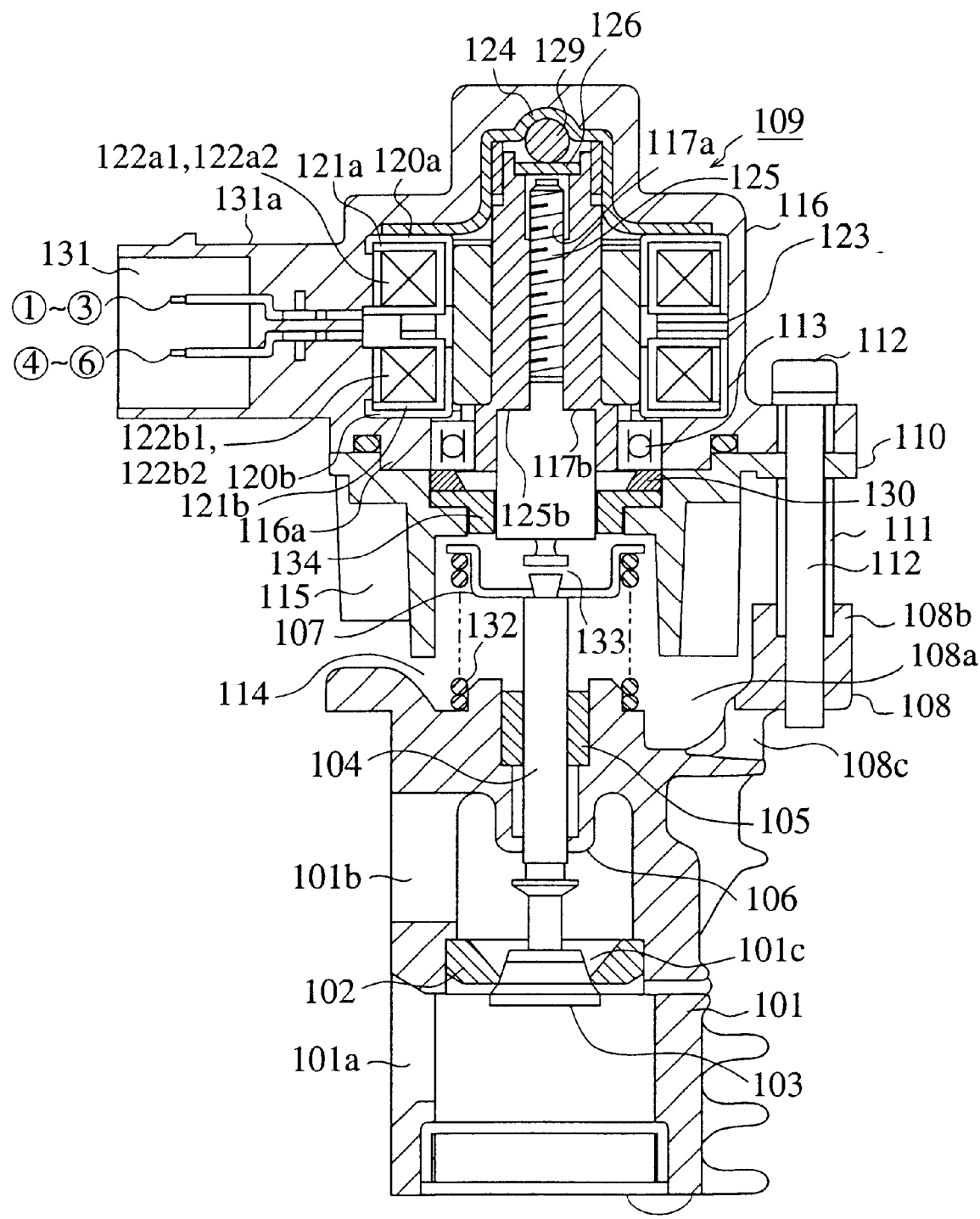
FIG. 11 is a longitudinal cross section of an electrical flow control valve according to a second embodiment of the present invention.

FIG. 11 is a longitudinal cross section of an electrical flow control valve according to a second embodiment of the present invention. In the figure, the particular feature is the provision of a boss 116a which maintains the bearing 113 in a determined position on the motor holder 110 side from the motor housing 116. Other features which are the same as those in FIG. 9 are denoted by similar reference numbers.

As above, according the second embodiment of the present invention, the axial alignment of the rotor and the stator is simply improved by maintaining the positional determination of the bearing 113 by the boss 116a formed integrally with the motor housing 116 by the same die.

Figure 12:
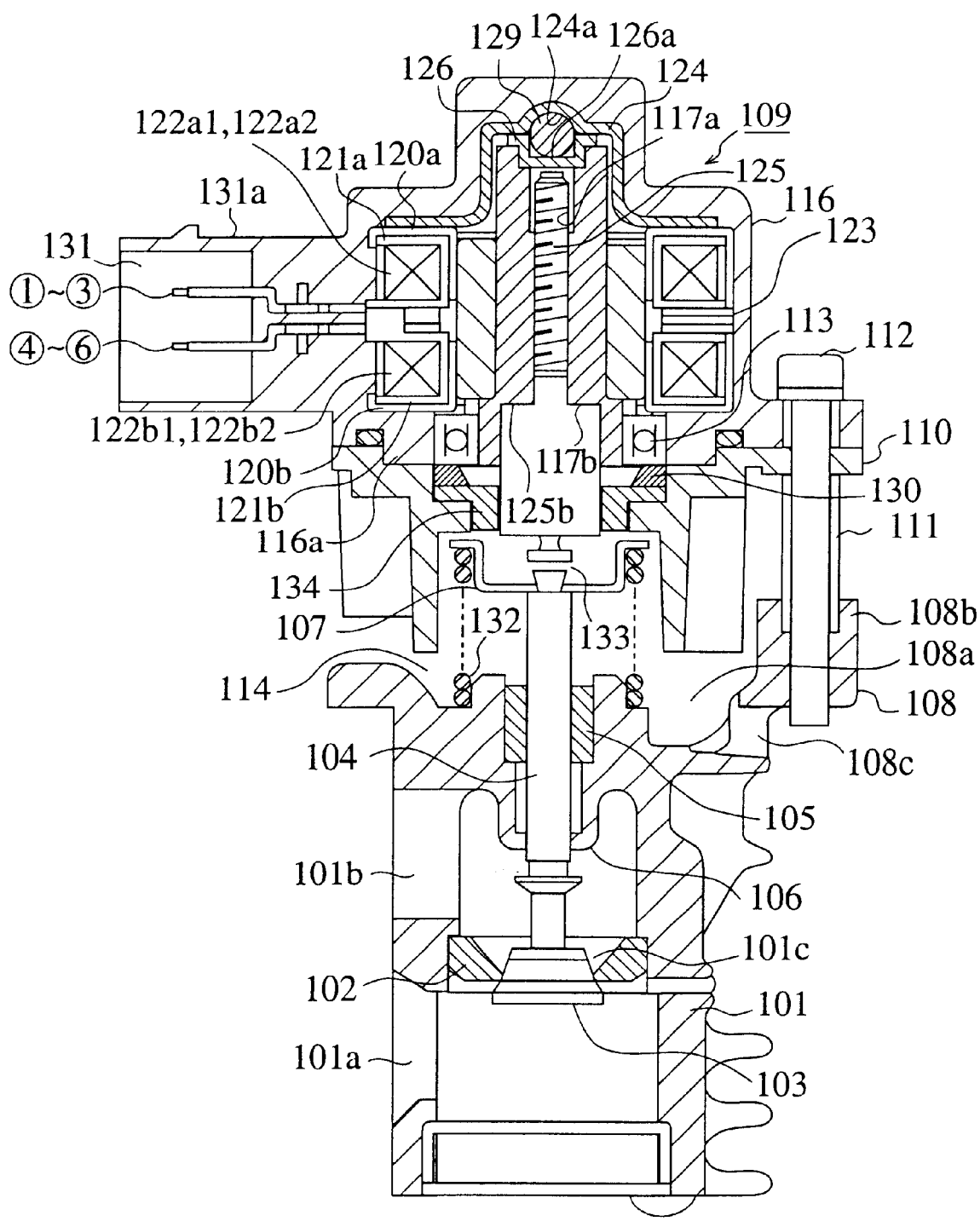
FIG. 12 is a longitudinal cross section of an electrical flow control valve according to a third embodiment of the present invention.

FIG. 12 is a longitudinal cross section of an electrical flow control valve according to a third embodiment of the present invention. Embodiment 3 is a combination of the first embodiment which dispensed with the sleeve spring and the second embodiment which performed the positional determination of the bearing 113 by the boss 116a integrally formed with the motor housing 116. The embodiments shown in FIGS. 9 and 11 represent the same elements with similar reference numerals.

As above, according to the third embodiment, the combination of embodiments 1 and 2 allows the provision of the advantages afforded by each embodiment in the form of an extremely effective electrical flow control valve. In the embodiments above, the electrical flow control valve was explained on the basis of one valve mounted on one valve axis. However, in the electrical flow control valve, two valves may also be mounted on the axis in the so-called double valve arrangement.

As discussed above, the electrical flow control valve according to the present invention controls the flow of exhaust gas in an exhaust gas re-circulation passage. As a result, it is possible to simplify the structure of the bearing of the motor and increase the accuracy of the bearing.

What is claimed is:

1. An electrical flow control valve for reciprocally displacing, in response to rotations of a rotor, an actuator rod threadedly engaged with the rotor, displacing with said actuator rod a valve shaft normally biased in the direction of closure, and opening a valve body, said electrical flow control valve comprising a retention section for centering a ball retained between one end of the rotor and a surface facing said end, wherein said retention section comprises:

a first plate fixed at said rotor, having a cylindrical indentation including a flat surface facing the ball, housing a lower portion of the ball; and a second plate which has a surface facing an upper portion of the ball and has a curvature complementary to a curvature of the ball, and which houses at least the first plate, the ball, and the end portion of the rotor;

wherein the second plate is a protective for preventing a resinous material from entering the rotor.

2. An electrical flow control valve according to claim 1, further comprising:

a boss projecting from a motor housing towards a motor holder, wherein said boss is integrated with said motor housing and retains a bearing in a fixed position;

wherein the motor housing houses an operating section including the rotor, the actuator rod, the first and second plates, the ball, and the retention section.

3. An electrical flow control valve for reciprocally displacing, in response to rotations of a rotor, an actuator rod threadedly engaged with the rotor, displacing with said actuator rod a valve shaft normally biased in the direction of closure, and opening a valve body, said electrical flow control valve comprising:

a retention section for centering a ball retained between one end of the rotor and a surface facing said end, wherein said retention section comprises:

a first plate having a surface facing the ball, abutting a lower portion of the ball; and a second plate which has a surface facing an upper portion of the ball and has a curvature complementary to a curvature of the ball, and which houses at least the first plate, the ball, and the end portion of the rotor having a protective function to prevent the entering of a resinous material; and a boss projecting from a motor housing towards a motor holder, wherein said boss is integrated with said motor housing and retains a bearing in a fixed position;

wherein the rotor is sustained and retained by the bearing and the retention section, and the bearing is placed in the motor housing on the side displaced reciprocally by the actuator rod;

wherein the motor housing houses an operating section including the rotor, the actuator rod, the first and second plates, the ball, and the retention section.

* * * * *